and al.
(45) Date of Patent: Feb. 9, 2016

(54) REMOTE DIRECT MEMORY ACCESS ACCELERATION VIA HARDWARE CONTEXT IN NON-NATIVE APPLCIATIONS

(71) Applicant: International Business Machines Corporation, Armonk, NY (US)

(72) Inventors: Omar Cardona, Cedar Park, TX (US); Jimmy R. Hill, Hutto, TX (US); Michael E. Lyons, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 13/844,458

(22) Filed: Mar. 15, 2013

(65) Prior Publication Data

US 2014/0280666 A1  Sep. 18, 2014

(51) Int. Cl.
*G06F 15/167* (2006.01)
*H04L 29/08* (2006.01)
*G06F 9/50* (2006.01)
*G06F 9/54* (2006.01)
*G06F 12/10* (2006.01)

(52) U.S. Cl.
CPC .......... *H04L 67/1097* (2013.01); *G06F 9/5016* (2013.01); *G06F 9/544* (2013.01); *G06F 12/1081* (2013.01)

(58) Field of Classification Search
CPC ............................ G06F 12/1081; G06F 9/544
USPC ........................................................ 709/212
See application file for complete search history.

(56) References Cited

U.S. PATENT DOCUMENTS

| 7,478,373 | B2 | 1/2009 | Bond et al. | |
|---|---|---|---|---|
| 7,761,619 | B2 | 7/2010 | Feng et al. | |
| 8,122,155 | B1 | 2/2012 | Marti | |
| 8,161,126 | B2 | 4/2012 | Fan | |
| 8,233,380 | B2 | 7/2012 | Subramanian et al. | |
| 2005/0038941 | A1* | 2/2005 | Chadalapaka et al. | 710/52 |
| 2005/0149817 | A1* | 7/2005 | Biran et al. | 714/758 |
| 2006/0136697 | A1* | 6/2006 | Tsao et al. | 711/206 |
| 2008/0043750 | A1* | 2/2008 | Keels et al. | 370/395.52 |
| 2010/0039010 | A1 | 2/2010 | Hong et al. | |
| 2010/0057932 | A1 | 3/2010 | Pope et al. | |

(Continued)

OTHER PUBLICATIONS

Frey et al.; "Minimizing The Hidden Cost of RDMA", ICDCS 29th IEEE International Conference on, Jun. 22-26, 2009, pp. 553-560.

(Continued)

*Primary Examiner* — Wing F Chan
*Assistant Examiner* — Joseph Maniwang
(74) *Attorney, Agent, or Firm* — Thomas E. Tyson; Gregory K. Goshorn; Greg Goshorn, P.C.

(57) ABSTRACT

Provided are techniques generating a data structure, wherein the data structure specifies both a specified size of a memory space to allocate within an application and a virtual address within the application to locate a data path transmission queue; including within a verb for allocating the data path transmission queue the defined data structure; in response to a call of the verb, allocate, within the application, the data path transmission queue of the specified size and at the virtual location; in response to a request to transmit control data, employ a remote direct memory access (RDMA) transmission path; and, in response to a request to transmit data, employ the data path transmission queue rather than an RDMA transmission path.

18 Claims, 7 Drawing Sheets

(56) References Cited

U.S. PATENT DOCUMENTS

| | | |
|---|---|---|
| 2011/0106905 A1 | 5/2011 | Frey et al. |
| 2012/0054471 A1 | 3/2012 | O'Clair et al. |
| 2012/0166886 A1* | 6/2012 | Shankar et al. ............... 714/43 |
| 2012/0216216 A1* | 8/2012 | Lopez Taboada et al. .... 719/314 |
| 2013/0275631 A1* | 10/2013 | Magro et al. .................... 710/28 |

OTHER PUBLICATIONS

Metzler, Bernard; "OpenRDMA Software Architecture", The OpenRDMA Project, Version 1.0, Dec. 21, 2004, pp. 1-17.

Mellanox Technologies, "RDMA Aware Network Programming User Manual," Rev. 1.4, (c) 2013.

* cited by examiner

REMOTE DIRECT MEMORY ACCESS ACCELERATION VIA HARDWARE CONTEXT IN NON-NATIVE APPLCIATIONS

FIELD OF DISCLOSURE

The claimed subject matter relates generally to computing services and, more specifically, to providing non-native applications enhanced access to remote direct memory access (RDMA) operations.

BACKGROUND OF THE INVENTION

Remote direct memory access (RDMA) is a mechanism for direct memory access communication from a userspace to remote memory resources. One standard for RDMA is Open-Fabrics Enterprise Distribution (OFED), which is written to be C/C++ compatible. Applications written in higher level languages such as JAVA® are typically required to translate native verbs to OFED verbs via tools such as JAVA® native interface (JNI). Such applications are typically be written against backward compatible application programming interfaces (APIs) such as Sockets Direct protocol (SDP), Internet Small Computer System Interface (iSCSI) extension for RDMA (iSER), Small Computer System Interface (SCSI) RDMA protocol (SRP), Network File System (NFS) over RDMA (NFSoRDMA) and so on.

SUMMARY

As the Inventors herein have realized, current approaches, such as those described above for enabling a higher level language such as JAVA® access to RDMA, present some disadvantages. For example, current approaches incur a kernel context switch cost and tend to provide no statistically significant benefit with respect to small messages. Therefore, small messages are typically addressed via a copy whereas large messages are registered on-the-fly when the registration cost is outweighed by the benefit of large data transfers.

Provided are mechanisms whereby an application written in any language can access the highest theoretical performance of an underlying RDMA device, including small message transfers. Non-native applications seeking the lowest latency can perform hardware (HW) context specific operations natively when a translation cost outweighs latency requirements. The disclosed technology optimizes the development of non-native applications for exploiting RDMA.

One focus of the disclosed technology is optimizing the development of non-native applications for exploitation of RDMA. For example, as the Inventors herein have realized, when jVerbs develops a user space component in JAVA®, there is a high cost for the development and maintenance effort. This disclosure describes techniques that may bound the development overhead for such applications to a minimum. This is achieved by having an application perform control path operations via standard calls through JNI or similar translations such that development and maintenance cost for the jVerbs application is primarily in the datapath. A significant reduction in development and operational cost is thus realized as the application is then primarily responsible for HW specific descriptor encoding/decoding.

Provided are techniques generating a data structure, wherein the data structure specifies both a specified size of a memory space to allocate within an application and a virtual address within the application to locate a data path transmission queue; including within a verb for allocating the data path transmission queue the defined data structure; in response to a call of the verb, allocate, within the application, the data path transmission queue of the specified size and at the virtual location; in response to a request to transmit control data, employ a remote direct memory access (RDMA) transmission path; and, in response to a request to transmit data, employ the data path transmission queue rather than an RDMA transmission path.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures.

DETAILED DESCRIPTION

Figure 1:
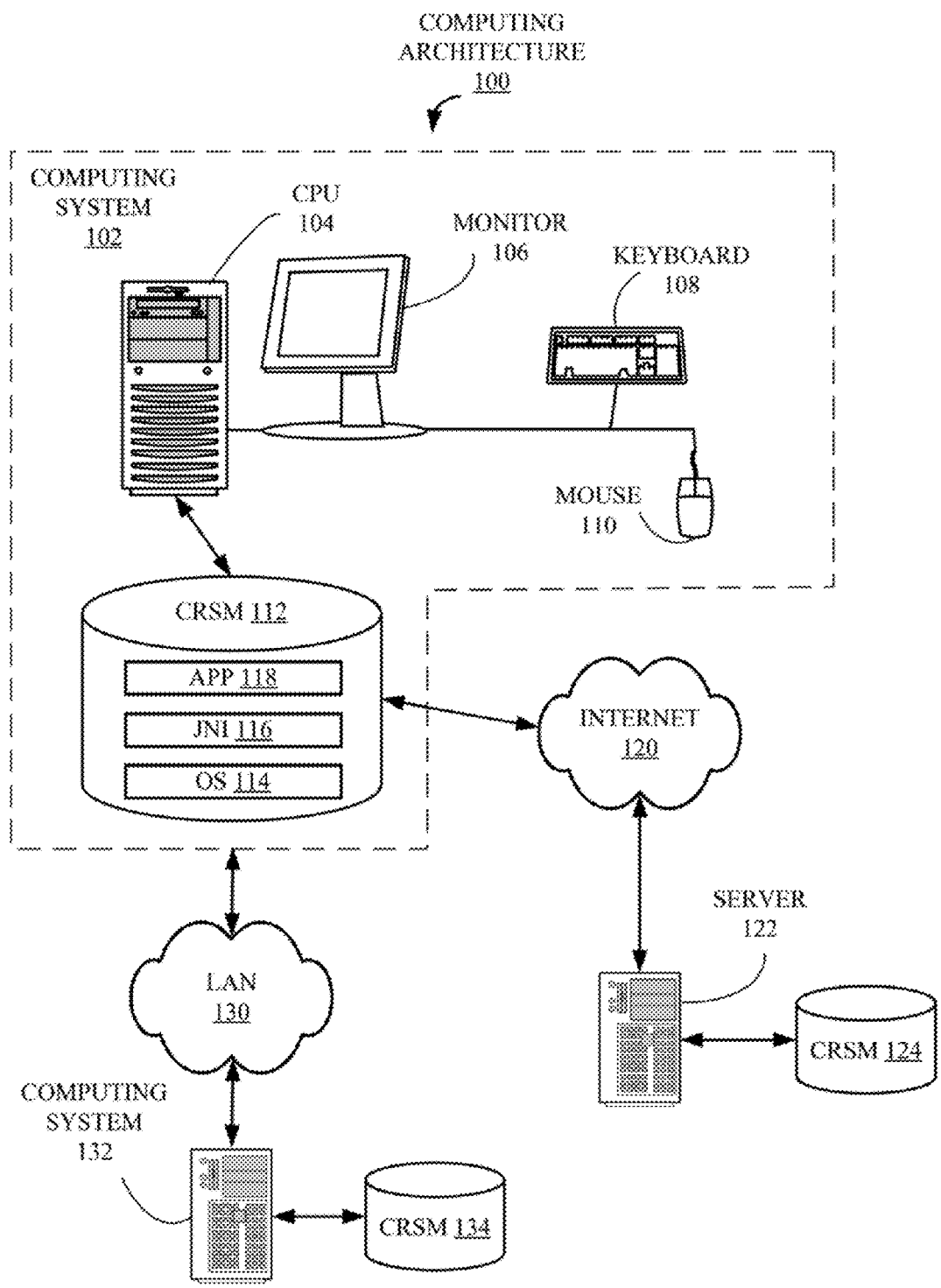
FIG. 1 is a block diagram of a computing system architecture that may implement the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the figures, FIG. 1 is a block diagram of a computing architecture 100 that may implement the claimed subject matter. A computing system 102 includes a central processing unit (CPU) 104, coupled to a display 106, a keyboard 108 and a pointing device, or "mouse," 110, which together facilitate human interaction with elements of architecture 100 and computing system 102. Also included in computing system 102 and attached to CPU 104 is a computer-readable storage medium (CRSM) 112, which may either be incorporated into client system 102 i.e. an internal device, or attached externally to CPU 104 by means of various, commonly available connection devices such as but not limited to, a universal serial bus (USB) port (not shown). CRSM 112 is illustrated storing an operating system (OS) 114, a JAVA® native interface (JNI) 116 and an application 118 that is configured in accordance with the claimed subject matter. Components 114, 116 and 118 and their relationship with the claimed subject matter are described in more detail below in conjunction with FIGS. 2-7.

Computing system 102 and CPU 104 are connected to the Internet 120, which is also connected to a server computer, or simply "server," 122. Server 122 is coupled to a CRSM 124. Computing system 102 is also coupled to a local area network 130, which is coupled to a second computing system 132. Computing system 132 is coupled to a CRSM 134. Although in this example, computing system 102 and server 122 are communicatively coupled via the Internet 120, they could also be coupled through any number of communication mediums such as, but not limited to, a LAN such as LAN 130. In the following description, application 118 is used as one example of a program that may take advantage of the disclosed technology. It should be noted there are many possible configurations of computing system architectures and computing systems that may implement the claimed subject matter, of which architecture 100 and computing system 102 are only simple examples.

Figure 2:
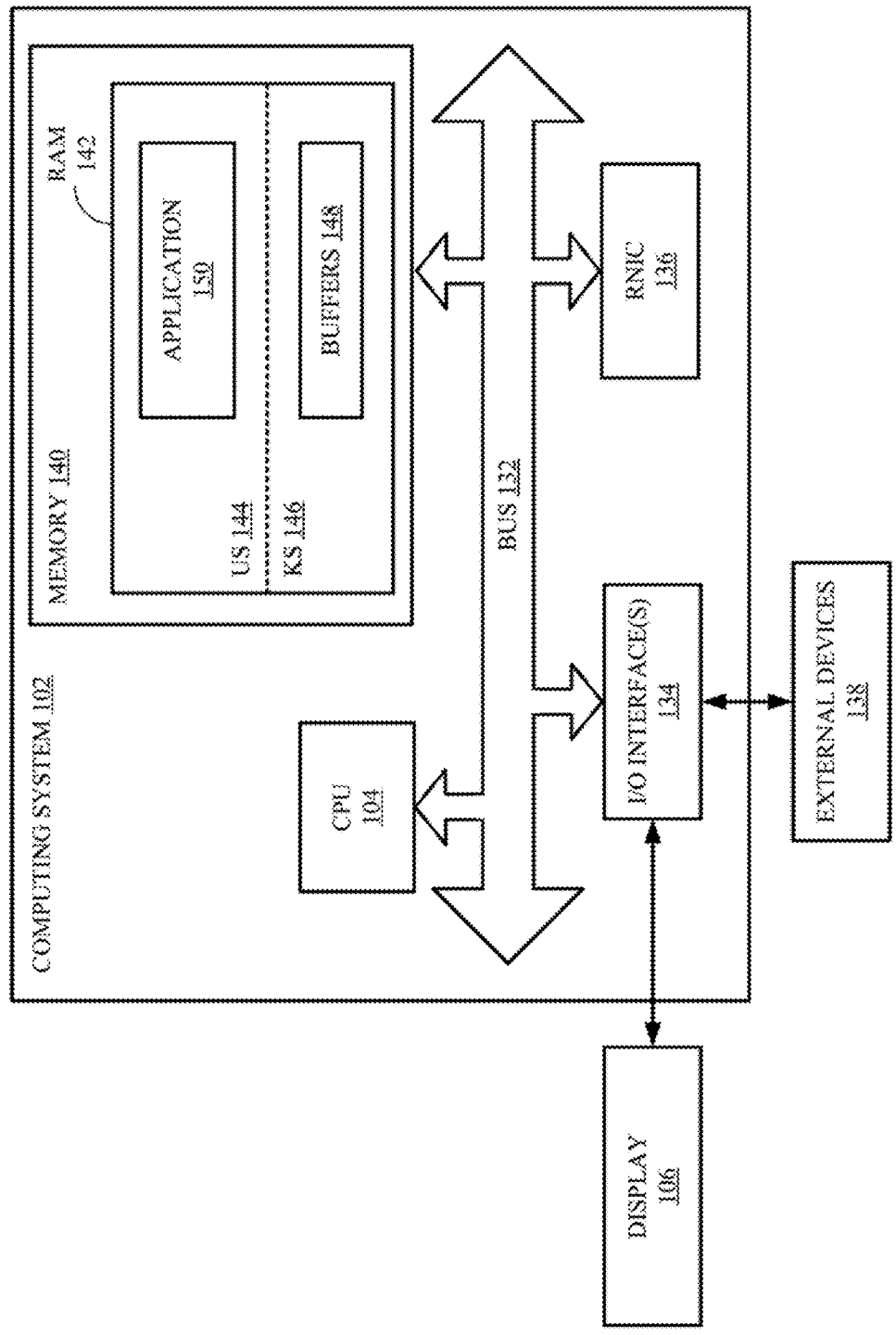
FIG. 2 is a block diagram of a computing system, first introduced in FIG. 1, in greater detail.

FIG. 2 is a block diagram of computing system 102, first introduced in FIG. 1, in greater detail. As shown in FIG. 1, computing system 102 is illustrated in the form of a general-purpose computing device. In this example, components of computing system 102 include, but are not limited to, CPU 104 (FIG. 1), which may include one or more processors (not shown), a system bus 132, which couples various components to CPU 104, including but not limited to, input/output (I/O) interfaces 134, a Remote Direct Memory Access (RDMA) network interface card (RNIC) 136 and memory 140. In this example, RNIC 135 provides a communication path between computing system 102 and the Internet 120 (FIG. 1) and could also provide a connection to LAN 130 (FIG. 1) or other networks and resources. I/O interfaces 134 enable various components to be coupled to computing system 102 such as display 106 (FIG. 1) and external devices 138. In this example, external devices 138 may include keyboard 108 (FIG. 1) and mouse 110 (FIG. 1).

Bus 132 represents one or more of any of several types of bus structures, which for the sake of simplicity are not shown, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 140 typically includes a variety of computer system readable media. Such media may be any storage media that is accessible CPU 104 via bus 132 and includes both volatile and non-volatile media. Computing system 102 and memory 140 may also further include other volatile/non-volatile computer system storage media. In this example, memory 140 includes random access memory (RAM) 142 and cache memory, or simply "cache," 144. RAM 142 is illustrated as separated into user space 146 and kernel space 148. RAM 142 is also illustrated storing in user space 146, an application 150, which is a copy of program 118 (FIG. 1) stored on CRSM 112 (FIG. 1). In other words, program 150 corresponds to logic associated with program 118 that has been loaded into RAM 142 for execution on CPU 104. Program 150 may be stored in one or more locations in memory 140, including RAM 142, which includes user space (US) 144 and kernel space (KS) 146 and may also be paged out to other storage media such as, but not limited to CRSM 112. Within kernel space 146 are buffers 148. Possible components of buffers 148 are explained below in conjunction with FIGS. 3 and 4.

Figure 3:
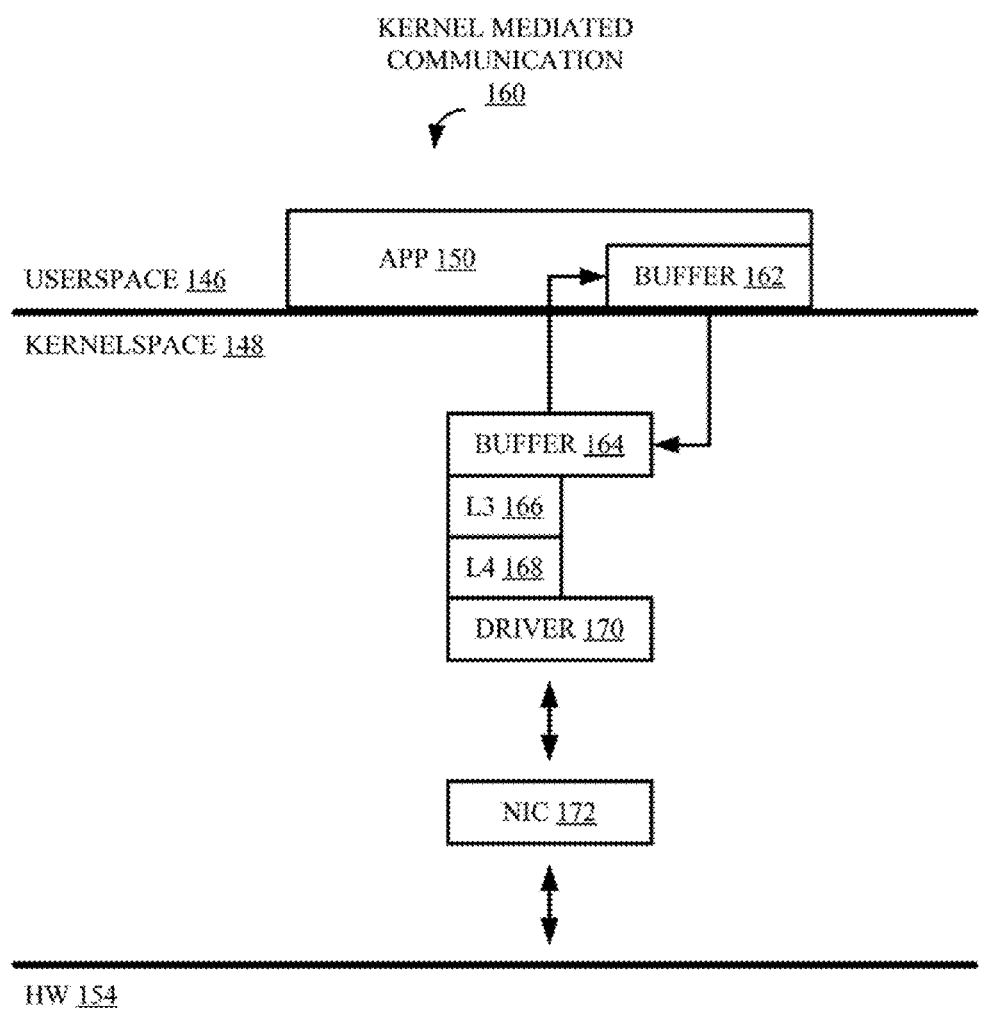
FIG. 3 is a block diagram illustrating kernel mediated communication.

FIG. 3 is a block diagram illustrating kernel mediated communication 160 that may be employed in conjunction with the claimed subject matter. As shown above in FIG. 2, application 150 (FIG. 2) is loaded into user space 144 (FIG. 2) of memory 140 (FIG. 2). Application 150 includes a buffer 162 that is employed in conjunction with a buffer 164 in kernel space 146 (FIG. 2). Buffer 164 is associated with layers of an Open Systems Interconnection (OSI) stack. i.e., an L3 166 and an L4 168. Coupled to buffer 164, L3 166 and L4 168 is a driver 170. Driver 170 controls the transfer of data between buffer 164, L3 166 and L4 168 and, in this example, a network interface card (NIC) 172. NIC 172 handles communication between kernel space 148 and a hardware space 154 and device (not shown) that might be in hardware space 154, such as, but not limited to, CRSM 112 (FIG. 1).

Kernel mediated communication 160 is typically multiplexed with both protocol and buffer 164, L3 166 and L4 168 controlled by a host CPU, which in the example is CPU 104 (FIGS. 1 and 2). Such a configuration provides low bandwidth for small messages and a high power consumption cost. Contention among shared resources is typically controlled by use of buffer 164, L3 166 and L4 168 and locks (not shown). One feature of kernel mediated communication 160 is that First Failure Data Capture (FFDC) is readily available.

Although the use of buffers and NICs should be familiar to those with skill in the relevant arts, the claimed subject matter necessitates that buffers 162 and 164 and NIC 172 be modified and that L2 166 and L3 168 be newly designed. In other words, new mechanisms tar kernel buffer and protocol management are needed to use RDMA in conjunction with the claimed subject matter. Modifications in accordance with the claimed subject matter are explained in more detail below in conjunction with FIGS. 5-7.

Figure 4:
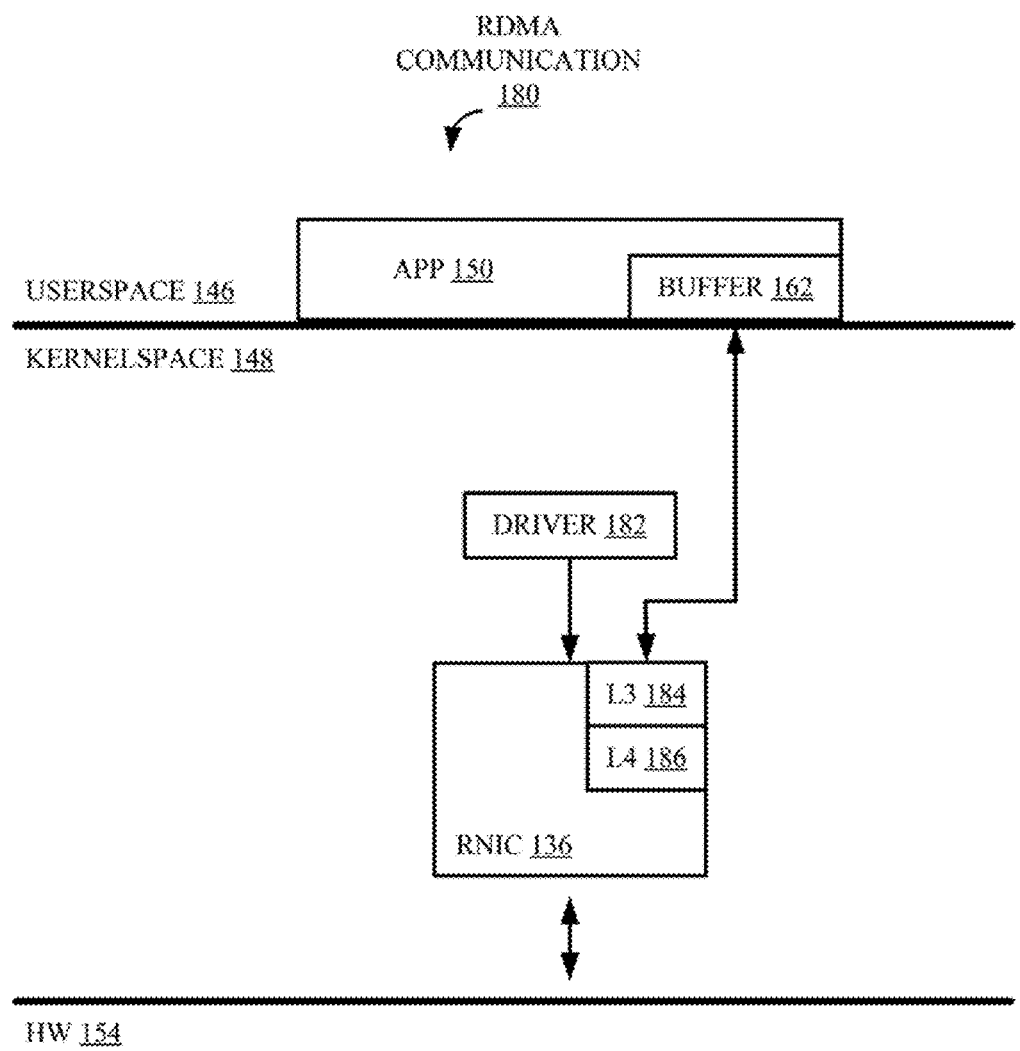
FIG. 4 is a block diagram illustrating remote direct memory access (RDMA), or "direct access," communication.

FIG. 4 is a block diagram illustrating RDMA communication 180 that may be employed in conjunction with the claimed subject matter. As shown above in FIGS. 2 and 3, application 150 (FIG. 2) is loaded into user space 146 (FIG. 2) of memory 140 (FIG. 2). Application 150 also includes buffer 162 (FIG. 3). In this configuration, buffer 162 is coupled with two (2) cache buffers associated with a RNIC 136 (FIG. 2), i.e. an L3 184 and an L4 186 in kernel space 148. A driver 182 is employed to control RNIC 136.

In contrast to kernel mediated communication 160, RDMA communication 180 has lower memory bus 132 (FIG. 2) bandwidth consumption, higher bandwidth for small message sizes, lower utilization of CPU 104 (FIGS. 1 and 2), lower power consumption and higher processing system capacity. However, RDMA communication 180 has a one-sided data placement mechanism and there is no FFDC readily available for L3 184 and L4 186. The claimed subject matter necessitates that buffer 162 and RNIC 136 be modified and that cache buffers 184 and 186 be newly designed. Modifications in accordance with the claimed subject matter are explained in more detail below in conjunction with FIG. 7.

Figure 5:
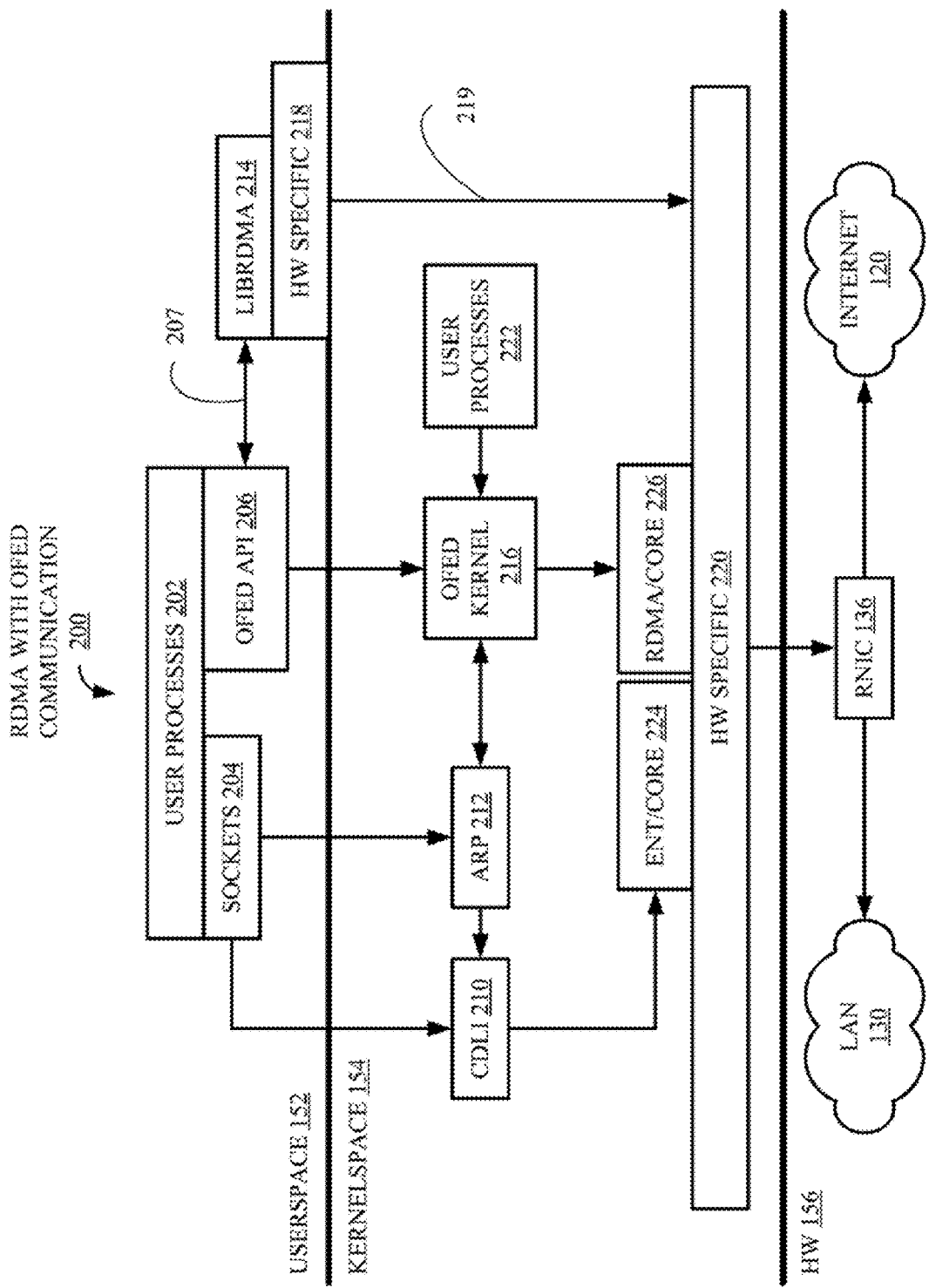
FIG. 5 is a block diagram illustrating RDMA with Open-Fabrics Enterprise Distribution (OFED) communication.

FIG. 5 is a block diagram illustrating RDMA with OFED communication 200. User processes 202 in user space 152 (FIGS. 2-4), such as, but not limited to, a user direct access programming library (uDAPL) and a message passing interface (MPI), employs sockets 204 and an OFED application programming interface (API) 206 to communicate with other components in user space 152 and kernel space 154 (FIGS. 2-4). Sockets 204 provides connections to a common data link interface (CDLI) 210 and an address resolution protocol component (ARP) 212, both of which are in kernel space 154. OFED API 206 may include elements such as, but not limited to, "libibverbs," which is a library that allows user space 152 processes to use RDMA verbs, and "librdmacm," which is a library that allows applications to set up reliable connected and unreliable datagram transfers when using RDMA adapters (not shown). OFED API 206 provides connections to a RDMA library (libRDMA) 214, which is in user space 152 and via a control and data path 207 to an OFED kernel 216, which is in kernel space 154. Although in a typical implementation, libRDMA 214 and a HW specific library, or simply "HW specific," 218 would be a single module, in accordance with the claimed subject matter, components 214 and 218 are separated into two different components, with libRDMA 214 being hardware agnostic beyond standard OFED interfaces and HW specific 218 being self-descriptive. LibRDMA 214 employs HW specific 218 to facilitate communication with HW specific drivers 220 in kernel space 154 via a data path 219.

User processes 222, such as hut not limited to a kernel direct access programming library (kDAPL), a session description library (SDP) and Internet Small Computer System Interface (iSCSI) extensions for RDMA (iSER), also access MID kernel 216. CDLI 2210 access HW specific drivers 220 via an ent/core 224. OFED kernel 216 access HW specific drivers 220 via a RDMA/core 226. Finally, HW specific drivers 220 provide access, in this example, to RNIC 136 (FIGS. 2 and 4) in HW 156 and thereby access to Internet 120 (FIG. 1) and LAN 130 (FIG. 1). The claimed subject matter necessitates that ent/core 224 and HW specific 220 be modified and that librdrma 214, HW specific 218 and RDMA/core 226 be newly designed. Modifications in accordance with the claimed subject matter are explained in more detail below in conjunction with FIG. 7.

Figure 6:
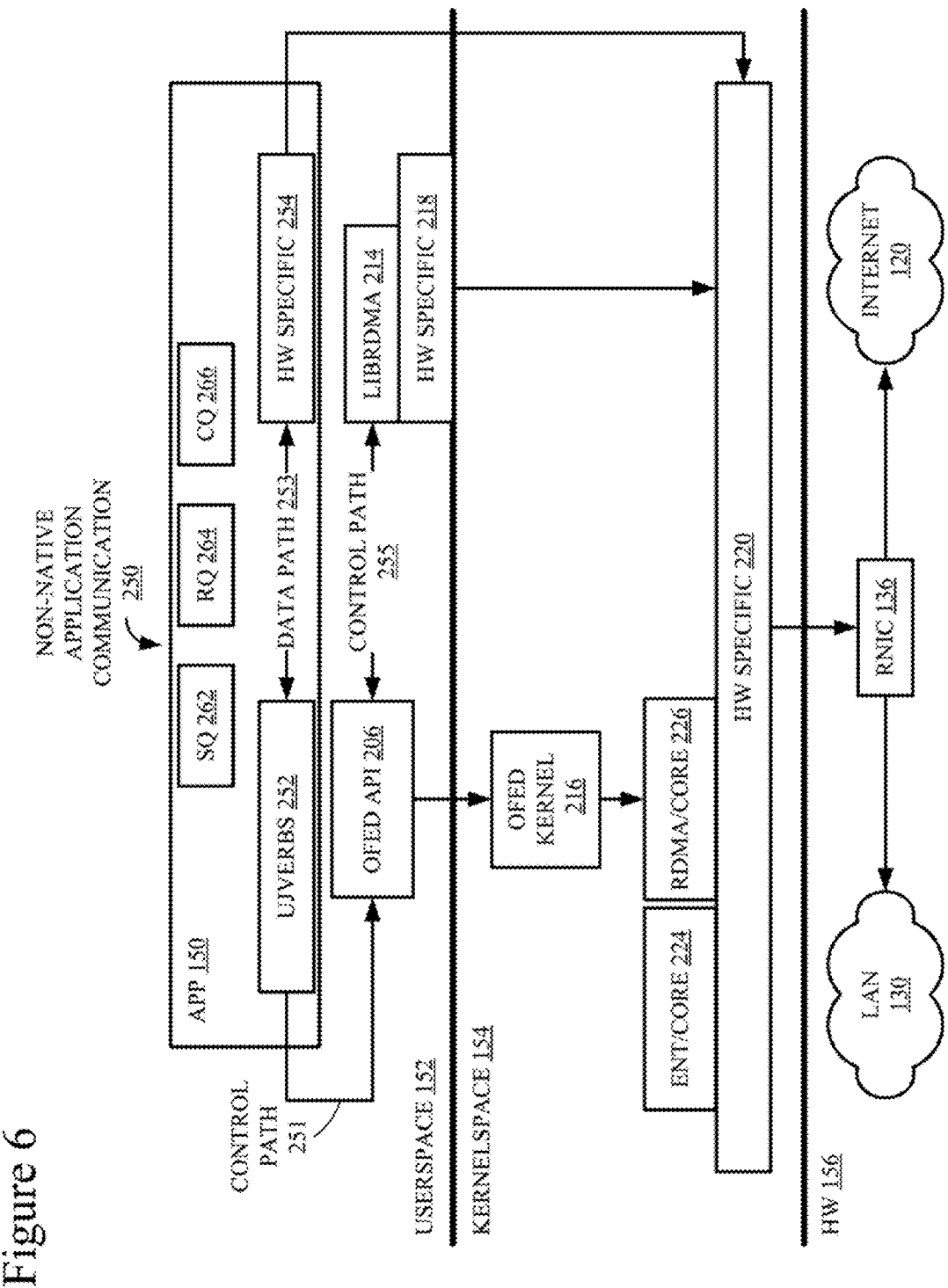
FIG. 6 is a block diagram illustrating Non-Native Application communication (NNAC) in accordance with the claimed subject matter.

FIG. 6 is a block diagram illustrating non-native application communication (NNAC) 250 in accordance with the claimed subject matter. Like FIG. 5 and RDMA with OFED communication 200, FIG. 6 and NNAC 250 include the elements internet 120, LAN 130, RNIC 136, user space 152, kernel space 154, HW space 156, OFED API 206, libRDMA 214, OFED kernel 216, HW specific 218, HW specific 220, ent/core 224 and RDMA/core 226.

In this example, uJverbs 252 access HW specific 254 via a data path 253 and OFED API 206 via a control path 253. OFED API 206 accesses libRDAM 214 via a control path 255. In other words, rather than a single path 207 (FIG. 5) for both control and data messages, there are different paths 251 and 253 for data and control messages, respectively. In this manner, an application (not shown) may perform control path operations via standard calls through JNI or similar translations such that development and maintenance cost for a jVerbs application is primarily in the datapath. A significant reduction in development and operational cost is thus realized as the application is then primarily responsible for HW specific descriptor encoding/decoding.

To implement this technology, an application, which in this example is app 150 (FIGS. 2-4) is provided means to generate application specific memory within app 150 memory space, specifically a Send Queue (SQ) 262, a Received Queue (RQ) and a Completion Queue (CQ) 266.

The flowing CODE EXAMPLE 1 illustrates modifications to a standard ibv_cq data structure, used as input to various verbs that control CQ 266 by enabling attributes of CQ 266 to be defined:

```
1) struct iby_cq *(*create_app_cq)
2)      (struct iby_context        *p_context,
3)      int32_t                    cqe,
4)      struct iby_comp_channel    *p_channel,
5)      int32_t                    comp_vector,
6)      struct app_cq_attrs        *p_app_attrs);
```

In the example above, line 6 has been added to define attributes associated with CQ 266. Extensions to the verb "ibv_create_cq" are then added to enable a caller to provide a specific size and virtual address corresponding to the CQ 266 when it is created. In addition, specific verbs, e.g. JAVA® jVerbs, that are modified in this example to take advantage of the modified data structure, iby_cq, described above, include but are not necessarily limited to: ibv_create_cq, ibv_poll_cq, ibv_req_notify_cq and ibv_cq_event.

Line 4 of the following CODE EXAMPLE 2 illustrates additions to a standard iby_qp structure used as inputs to verbs that control SQ 262 and RQ 262 by enabling attributes associated with SQ 262 and RQ 264 to be defined:

```
1) struct iby_qp *(*create_app_qp)
2)      (struct iby_pd             *p_pd,
3)      struct iby_qp_init_attr    *p_attr,
4)      struct app_qp_attrs        app_attrs);
```

In this manner, app 150 may control the creation of SQ 262, RQ 264 and CQ 266. Extensions to the verb "ibv_create_qp" are then added to enable a caller to provide a specific size and virtual address corresponding to the SQ 262 and RQ 264 when they are created. In addition, specific verbs that are then modified in this example to take advantage of the modified data structure, iby_qp, described above, include but are not necessarily limited to: ibv_post_srq_recv, ibv_create_qp, ibv_post_send and ibv_post_recv. It should be understood that, in conjunction with control in accordance with the disclosed technology, app 150 also becomes responsible for memory alignment and size requirements for the specific hardware involved.

Figure 7:
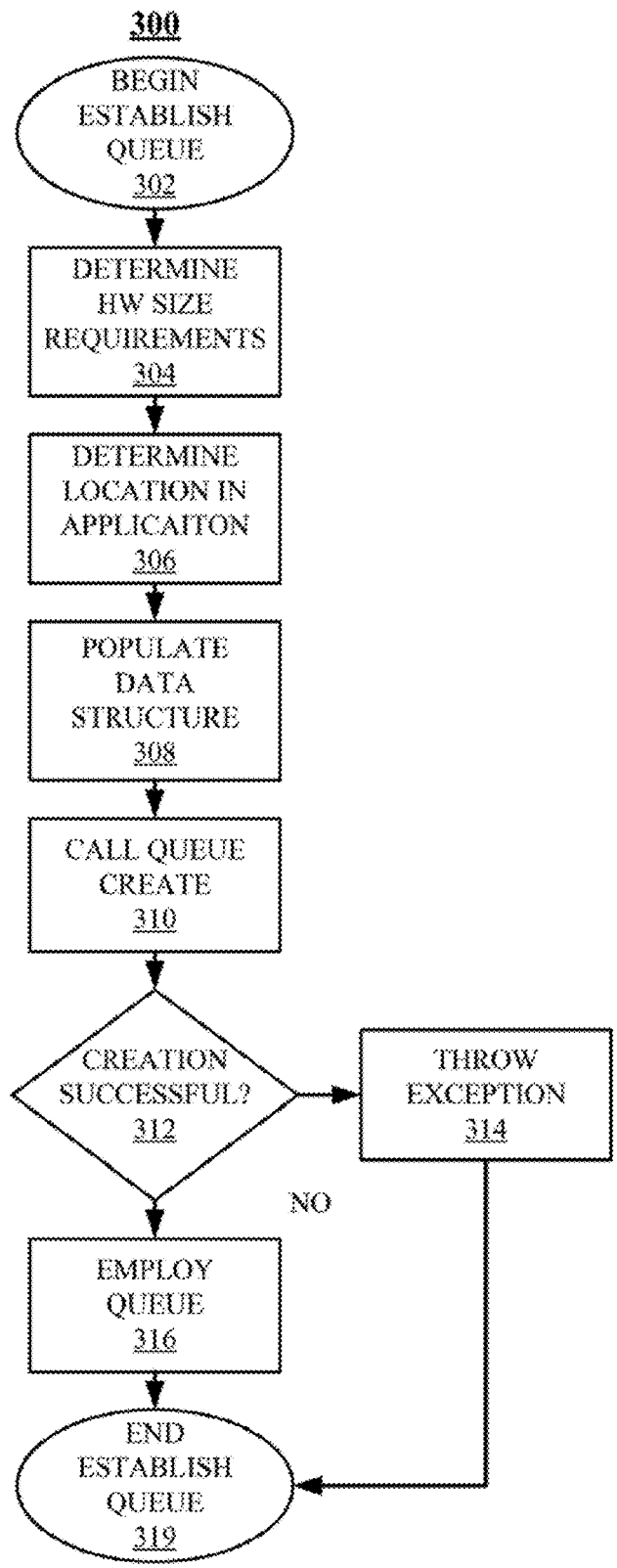
FIG. 7 is a flowchart of one example of a "Establish Queue" process that implements aspects of the claimed subject matter.

FIG. 7 is a flowchart of one example of a "Establish Queue" process 300 that implements aspects of the claimed subject matter. In this example, aspects of process 300 are associated with logic stored on CRSM 112 (FIG. 1) and executed on CPU 104 (FIGS. 1 and 2).

Process 300 starts in a "Begin Establish Queue" block 302 and proceed immediately to a "Determine Hardware (HW) Size Requirements" 304. During processing associated with block 304, a determination is made as to the size of queue need for a particular hardware device for which a queue is to be created. During processing associated with a "Determine Location in Application" block 306, a determination is made as to a particular location within an applications memory space that may be utilized by the queue being established. In one embodiment, information about both the size and the location of the queue to be created may be supplied by the application. During processing associated with a "Populate Data Structure" block 308, a data structure is generated to store the values calculated during processing associated with blocks 304 and 306. In this example, if the queue being generated is a control queue the "app_cq_attrs" structure, shown above at line 6 of CODE EXAMPLE 1, is populated. If the queue being generated is a control queue the "app_qp_attrs" structure, shown above at line 4 of CODE EXAMPLE 2, is populated.

During processing associated with a "Call Queue Create" block 310, the data structure populated during processing associated with block 308 is included in a call to a function to create a queue as in CODE EXAMPLE 3 above. During processing associated with a "Creation Successful?" block 312, a determination is made as to whether or not the call made during processing associated with block 310 was successful. If not, control proceeds to a "Throw Exception" block 314. During processing associated with block 314 appropriate measures are taken to notify the administrator that initiated process 300 is notified so that remedial actions may be taken. In one embodiment, a JAVA native interface (JNI) callback is employed. If queue creation was successful, control proceeds to an "Employ Queue" block 316. During processing associated with block 316, the created queue is used for its intended purpose. Finally, control proceeds to an "End Establish Queue" block in which process 300 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method, comprising:
generating a data structure, wherein the data structure specifies both a specified size of a memory space to allocate within an application and a virtual address within the application to locate a data path transmission queue;
including within a verb for allocating the data path transmission queue the defined data structure;
in response to a call of the verb, allocating, within the application, the data path transmission queue of the specified size and at the virtual location;
in response to a request to transmit control data, employing a remote direct memory access (RDMA) transmission path;
in response to a request to transmit data, employing the data path transmission queue rather than an RDMA transmission path.

2. The method of claim 1, wherein the data path transmission queue is a queue pair consisting of a send queue and a receive queue.

3. The method of claim 1, wherein the data path transmission queue is a completion queue.

4. The method of claim 1, wherein the verb is a JAVA® jVerb.

5. The method of claim 1, wherein the application provides contiguous memory allocation and byte alignments.

6. The method of claim 1, wherein in response to an error a JAVA native interface (JNI) callback is called.

7. An apparatus, comprising:
a processor;
a non-transitive computer-readable storage medium (CRSM) coupled to the processor;
a data structure, wherein the data structure specifies both a specified size of a memory space to allocate within an application and a virtual address within the application to locate a data path transmission queue; and
logic, stored on the CRSM and executed on the processor, for:
including within a verb for allocating the data path transmission queue the defined data structure;
in response to a call of the verb, allocating, within the application, the data path transmission queue of the specified size and at the virtual location;
in response to a request to transmit control data, employing a remote direct memory access (RDMA) transmission path;
in response to a request to transmit data, employing the data path transmission queue rather than an RDMA transmission path.

8. The apparatus of claim 7, wherein the data path transmission queue is a queue pair consisting of a send queue and a receive queue.

9. The apparatus of claim 7, wherein the data path transmission queue is a completion queue.

10. The apparatus of claim 7, wherein the verb is a JAVA® jVerb.

11. The apparatus of claim 7, wherein the application provides contiguous memory allocation and byte alignments.

12. The apparatus of claim 7, wherein in response to an error a JAVA® native interface (JNI) callback is called.

13. A computer programming product, comprising:
a non-transitive computer-readable storage medium (CRSM); and
logic, stored on the CRSM for execution on a processor, for:
generating a data structure, wherein the data structure specifies both a specified size of a memory space to allocate within an application and a virtual address within the application to locate a data path transmission queue; and
including within a verb for allocating the data path transmission queue the defined data structure;
in response to a call of the verb, allocating, within the application, the data path transmission queue of the specified size and at the virtual location;
in response to a request to transmit control data employing a remote direct memory access (RDMA) transmission path;
in response to a request to transmit data, employing the data path transmission queue rather than an RDMA transmission path.

14. The computer programming product of claim 13, wherein the data path transmission queue is a queue pair consisting of a send queue and a receive queue.

15. The computer programming product of claim 13, wherein the data path transmission queue is a completion queue.

16. The computer programming product of claim 13, wherein the verb is JAVA® jVerb.

17. The computer programming product of claim 13, wherein the application provides contiguous memory allocation and byte alignments.

18. The computer programming, product of claim 13, wherein in response to an error a JAVA® native interface (JNI) callback is called.

* * * * *